(12) United States Patent
Sivasankaran et al.

(10) Patent No.: US 8,739,510 B2
(45) Date of Patent: Jun. 3, 2014

(54) HEAT EXCHANGER FOR A COMBINED CYCLE POWER PLANT

(75) Inventors: Rakesh Sivasankaran, Karnataka (IN); Timothy Russell Bilton, Simpsonville, SC (US); Hatim Khandwavala, Karnataka (IN); Indrajit Mazumder, Karnataka (IN); Ezhil Nargunan, Tamil Nadu (IN)

(73) Assignee: General Electric Company, Schenectady, NY (US)

( * ) Notice: Subject to any disclaimer, the term of this patent is extended or adjusted under 35 U.S.C. 154(b) by 888 days.

(21) Appl. No.: 12/913,898

(22) Filed: Oct. 28, 2010

(65) Prior Publication Data

US 2012/0102962 A1  May 3, 2012

(51) Int. Cl.
*F01K 23/10* (2006.01)

(52) U.S. Cl.
USPC ........................................................ 60/39.182

(58) Field of Classification Search
CPC ................................ F01K 23/10; Y02E 20/16
USPC .......... 60/267, 39.182, 730, 806, 39.5, 39.83, 60/272, 266
See application file for complete search history.

(56) References Cited

U.S. PATENT DOCUMENTS

| 4,961,311 | A | 10/1990 | Pavel et al. | |
|---|---|---|---|---|
| 5,797,259 | A | * 8/1998 | Nielsen et al. | 60/39.182 |
| 6,109,037 | A | 8/2000 | Kumagai et al. | |
| 7,032,373 | B2 | * 4/2006 | Franke et al. | 60/39.182 |

* cited by examiner

*Primary Examiner* — Phutthiwat Wongwian
*Assistant Examiner* — Alain Chau
(74) *Attorney, Agent, or Firm* — Cantor Colburn LLP

(57) ABSTRACT

A combined cycle power plant includes a gas turbomachine, a steam turbomachine operatively connected to the gas turbomachine, a heat recovery steam generator (HRSG) operatively connected to the gas turbomachine and the steam turbomachine, and a cooling system fluidly connected to the gas turbomachine. The cooling system is configured and disposed to pass a coolant through the gas turbomachine to absorb heat. A condensate system is fluidly connected to the steam turbine and the HRSG. The condensate system is configured and disposed to deliver a steam condensate from the steam turbine to the HRSG. A heat exchange member is fluidly connected to the cooling system and the condensate system. The heat exchange member is configured and disposed to transfer heat entrained in the coolant to the steam condensate.

10 Claims, 2 Drawing Sheets

HEAT EXCHANGER FOR A COMBINED CYCLE POWER PLANT

BACKGROUND OF THE INVENTION

The subject matter disclosed herein relates to the art of combined cycle power plants and, more particularly, to a heat exchanger for a combined cycle power plant.

In a combined cycle power plant (CCPP), a gas turbomachine drives a generator, which produces electricity. Waste heat from the gas turbomachine is used to generate steam in a heat recovery steam generator (HRSG), which, in turn, is used to generate additional electricity via a steam turbomachine. More specifically, a combined cycle is characteristic of a power producing engine or plant that employs more than one thermodynamic cycle. Heat engines, such as gas turbomachines, are only able to use a portion of the energy their fuel generates (usually less than 50%). Any remaining heat (e.g. hot exhaust fumes) from combustion is generally wasted. Combining two or more "cycles" such as a Brayton cycle (Gas) and a Rankine Cycle (Steam) results in improved output efficiency.

Conventionally, the gas turbomachine includes a turbomachine system cooling system that supplies coolant, typically in the form of water, to lower lubrication temperatures, provide coolant to the generator, and other components. Heat entrained in the coolant is expelled to atmosphere using a cooling module such as a fin-fan cooler. The coolant flows in a closed loop between the turbomachine and the fin-fan cooler to capture and reject heat.

BRIEF DESCRIPTION OF THE INVENTION

According to one aspect of the invention, a combined cycle power plant includes a gas turbomachine, a steam turbomachine operatively connected to the gas turbomachine, a heat recovery steam generator (HRSG) operatively connected to the gas turbomachine and the steam turbomachine, and a cooling system fluidly connected to the gas turbomachine. The cooling system is configured and disposed to pass a coolant through the gas turbomachine to absorb heat. A condensate system is fluidly connected to the steam turbine and the HRSG. The condensate system is configured and disposed to deliver a steam condensate from the steam turbine to the HRSG. A heat exchange member is fluidly connected to the cooling system and the condensate system. The heat exchange member is configured and disposed to transfer heat entrained in the coolant to the steam condensate.

According to another aspect of the invention, a method of operating a combined cycle power plant includes passing a coolant through a cooling system into a gas turbomachine portion of the combined cycle power plant (CCPP), absorbing heat from the gas turbomachine into the coolant, directing the coolant through a heat exchange member, guiding a steam condensate through a steam condensate system fluidly connected to a steam turbomachine portion of the CCPP, passing the steam condensate through the heat exchange member, transferring the heat entrained in the coolant to the steam condensate in the heat exchange member to form heated steam condensate, and passing the heated steam condensate to a heat recovery steam generator (HRSG).

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
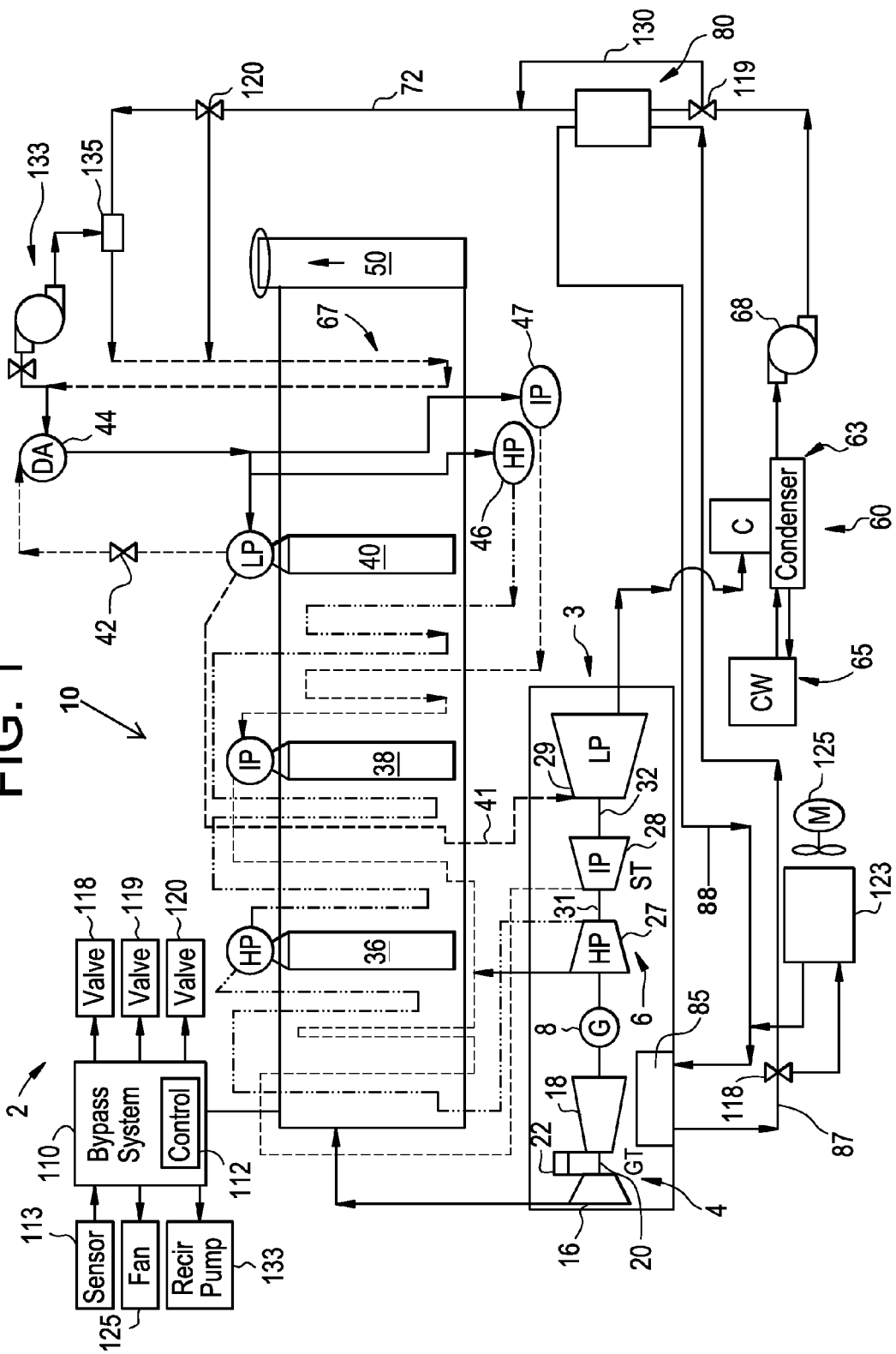
FIG. 1 is a schematic diagram illustrating a combined cycle power plant in accordance with an exemplary embodiment.

With reference to FIG. 1, a combined cycle power plant (CCPP) in accordance with an exemplary embodiment is indicated generally at 2. CCPP 2 includes a turbomachine system 3 having a gas turbomachine 4 operatively connected to a steam turbomachine 6 through a generator 8. Gas turbomachine 4 and steam turbomachine 6 are also connected to a heat recovery steam generator 10. Gas turbomachine 4 includes a compressor section 16 operatively connected to a turbine section 18 by a common compressor/turbine shaft 20. Compressor section 16 and turbine section 18 are also connected by a combustor 22. Air is compressed in compressor section 16 and directed to combustor 22 to mix with fuel and form a combustible mixture. The combustible mixture is ignited to form combustion gases that are passed into turbine section 18. Thermal and kinetic energy from the combustion gases is converted to mechanical rotational energy in turbine section 18. The mechanical energy is employed to drive generator 8 and steam turbomachine 6.

Steam turbomachine 6 includes a high pressure (HP) steam section 27, an intermediate pressure (IP) steam section 28, and a low pressure (LP) section 29. HP section 27 is operatively coupled to IP steam section 28 by a first shaft 31 and IP steam section 28 is operatively coupled to LP steam section 29 by a second shaft 32. In accordance with the exemplary embodiment, steam turbomachine 6 is fluidly connected to HRSG 10. More specifically, HP steam section 27 is fluidly connected to an HP section 36 of HRSG 10 by a conduit (not shown). Likewise, IP steam section 28 is fluidly connected to an IP section 38 of HRSG 10 by another conduit (also not shown), and LP steam section 29 is fluidly connected to an LP evaporator section 40 of HRSG by a conduit 41. A valve 42 fluidly connects LP evaporator 40 to a deaerator 44. Deaerator 44 includes an HP outlet port 46 and an IP outlet port 47. Deaerator 44 is configured to remove air and other dissolved gases from feedwater that is passed into HRSG 10. Finally, HRSG 10 is shown to include an exhaust stack 50. At this point it should be understood that while the exemplary embodiments are shown in connection with a three-pressure HRSG system, other HRSG systems, including two-pressure HRSG systems can also be employed. Also, it should be understood that both reheat and non-reheat HRSG systems can be employed.

CCPP 2 is further shown to include a condensate system 60 that is fluidly connected to LP steam section 29 of steam turbomachine 6. Condensate system 60 condenses LP steam from LP steam section 29 to provide feedwater to HRSG 10. Condensate system 60 includes a condenser 63 that receives steam from LP steam turbine 29, and a cold water system 65. Cold water system 65 passes cold water in proximity to the LP steam to form condensate. The condensate is then passed to an LP economizer 67 by a condensate extraction pump 68 through a conduit 72.

In accordance with the exemplary embodiment, conduit 72 passes through a heat exchanger 80. Heat exchanger 80 raises a temperature of the condensate passing to LP economizer 67. Raising the temperature of the condensate helps ensure that temperatures at exhaust stack 50 remain above an acid dew point temperature. In accordance with one aspect of the exemplary embodiment, the temperature of the condensate exiting heat exchanger 80 is in a range of about 95° F. (36° C.) to about 155° F. (68.3° C.). Of course it should be understood that the temperature range can vary depending on a wide variety of internal and external operating conditions. The heated medium that is employed to raise the temperature of the condensate is derived from a turbomachine system cooling system 85 of turbomachine system 3.

Cooling system 85 passes a coolant, such as water, through various portions of turbomachine system 3 to reduce temperatures. Cooling system 85 may include one or more components such as lubricant coolers, generator coolers, atomizing air coolers, turbine leg coolers and the like. The coolant absorbs heat from the various components. The coolant is then passed to heat exchanger 80 via a supply conduit 87 and is returned to turbomachine system cooling system 85 through a return conduit 88. In accordance with one aspect of the exemplary embodiment, the coolant flowing through supply conduit 87 is at a temperature in a range of about 110° F. (43.3° C.) to about 170° F. (76.6° C.). The coolant returning from heat exchanger 80 is at a temperature in a range of about 90° F. (32.2° C.) to about 150° F. (65.5° C.). Of course it should be understood that the above described temperatures may vary. The coolant flowing through heat exchanger 80 gives up heat to the condensate. In this manner, the condensate entering HRSG 10 is pre-heated to ensure that flue gas temperature in exhaust stack 50 remains above the acid dew point. Moreover, by using cooling to provide the pre-heat, there is no need for dedicated heaters or for a LP recirculation pump that recirculates feedwater within LP economizer 67. Accordingly, not only does the exemplary embodiment enhance operation of CCPP 2, but also eliminates the need for a variety of costly components to further enhance operational efficiencies Under certain operating conditions, during particular seasons, in certain environments or during start-up, condenser discharge temperature is too low to benefit from a heat exchange involving cooling. That is, the temperature of the coolant is insufficient to raise the temperature of the condensate/feedwater to ensure that the flue gas in the exhaust stack remains above the acid dew point temperate. In such cases, dedicated heating of the condensate may be more desirable. Accordingly, turbomachine system 3 includes a bypass system 110

Bypass system 110 includes a controller 112, and a sensor 113 that is configured and disposed to sense a temperature of the condensate passing from heat exchanger 80. In the event that the temperature of the condensate is below a desired temperature, the degree of which can vary depending on various internal and external conditions, controller 112 activates a plurality of valves 118-120 that initiate a bypass of heat exchanger 80. More specifically, valve 118 initiates a bypass of turbomachine system cooling system 85. That is, instead of passing the coolant to heat exchanger 80, coolant is passed to heat exchange device such as a fin-fan cooler 123. Of course it should be understood that the heat exchange device can take on a variety of forms including cooling towers, wet surface air coolers and the like. Heat is removed from the coolant by passing air currents generated by a fan 125 over fin-fan cooler 123. Valve 119 initiates a bypass of heat exchanger 80 by directing the condensate through a bypass loop 130. Finally, valve 120 directs the condensate from LP economizer 67 to a LP recirculation pump 133 and a temperature control module 135. Temperature control module 135 replaces heat exchanger 80 and is activated to elevate a temperature of the condensate. LP recirculation pump 133 passes the condensate through LP economizer to ensure that flue gas within exhaust stack 50 remain above the acid dew point temperature.

The incorporation of the bypass system allows the exemplary embodiment to heat the condensate using the turbomachine system cooling system under a wide variety of operating conditions. As noted above, using the turbomachine system cooling to heat the condensate reduces operational costs by eliminating the need for dedicated heating and the operation of the LP recirculation pump. However, under certain circumstances when turbomachine system cooling is not sufficient to maintain flue gas temperature above the acid dew point, the bypass system is activated. The bypass system ensures that the condensate temperature remains above the sulphur or acid dew point temperature. It is desirable to maintain the flue gas at or above sulphur dew point temperature to avoid sulphuric acid formation which occurs when $SO_2/SO_3$ in the flue gas reacts with moisture in the exhaust. Avoiding sulphuric acid formation prevents corrosion and other detrimental effects.

Figure 2:
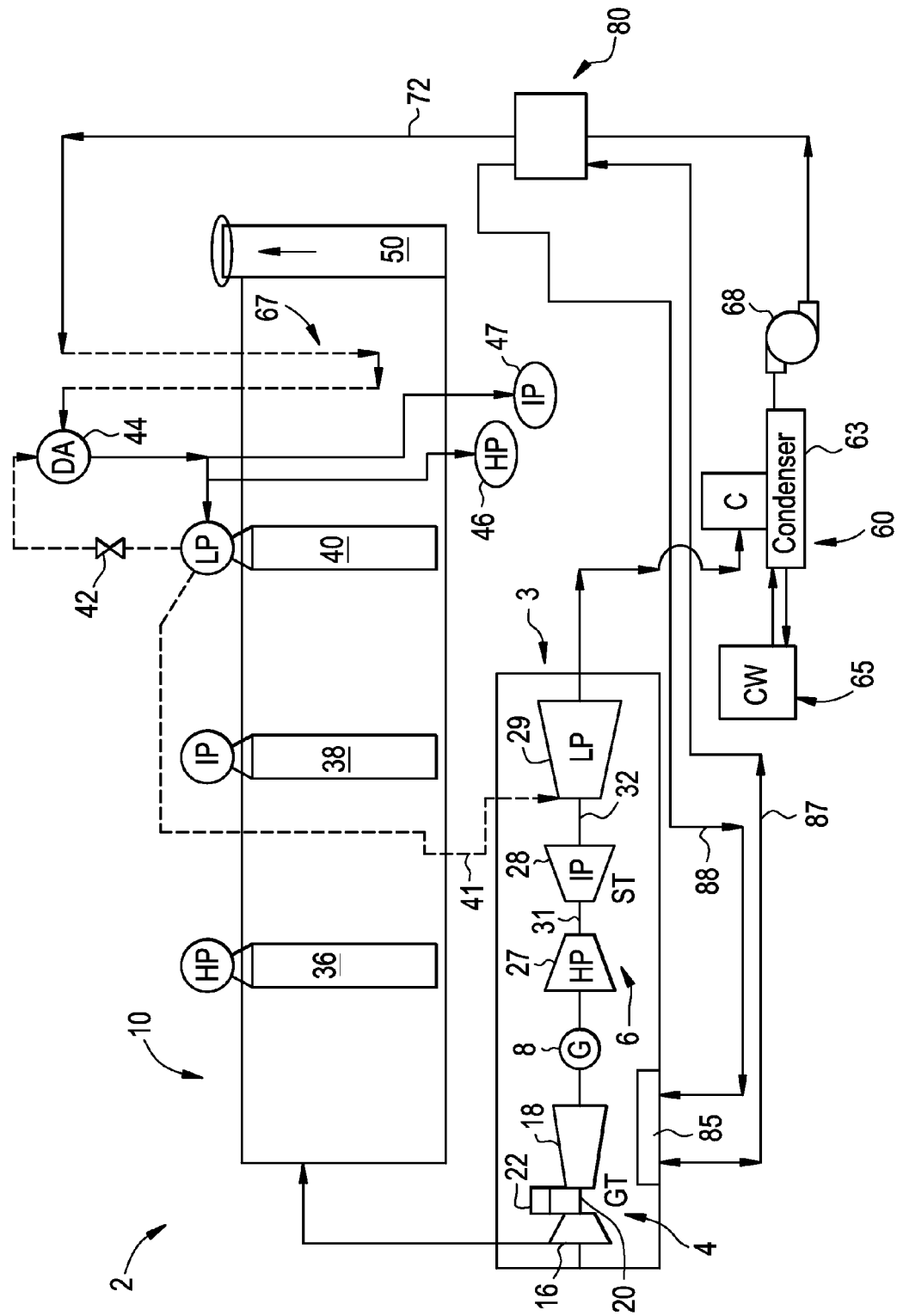
FIG. 2 is a schematic diagram illustrating a combined cycle power plant in accordance with another aspect of the exemplary embodiment.

Under other operating conditions, during particular seasons, and/or in certain other environments condenser discharge temperature is high enough such that the by-pass system is not required. Under such conditions, CCPP 2 takes on a configuration such as shown in FIG. 2. In the arrangement shown in FIG. 2, cooling system 85 is directly fluidly connected to heat exchanger 80 and conduit 72 is directly fluidly connected to deaerator 44. Eliminating the need for the by-pass system lowers the over all cost of the CCPP as well as eliminates various maintenance concerns.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A combined cycle power plant comprising:
  a gas turbomachine;
  a steam turbomachine operatively connected to the gas turbomachine;
  a heat recovery steam generator (HRSG) operatively connected to the gas turbomachine and the steam turbomachine;
  a cooling system fluidly connected to the gas turbomachine, the cooling system being configured and disposed to pass a coolant through the gas turbomachine to absorb heat;
  a condensate system fluidly connected to the steam turbomachine and the HRSG, the condensate system being configured and disposed to deliver a steam condensate from the steam turbomachine to the HRSG;

a heat exchange member fluidly connected to the cooling system and the condensate system, the heat exchange member being configured and disposed to transfer heat entrained in the coolant to the steam condensate;
a fin-fan cooler; and
a bypass system selectively fluidly connecting the fin-fan cooler to the cooling system.

2. The combined cycle power plant according to claim 1, further comprising: a controller operatively connected to the bypass system, the controller being configured and disposed to selectively fluidly connect the fin-fan cooler and disconnect the heat exchange member based on a temperature differential between the coolant and the steam condensate.

3. The combined cycle power plant according to claim 2, further comprising: a recirculation pump fluidly connected between the condensate system and the HRSG, the controller being configured and disposed to selectively connect the recirculation pump to the HRSG and the condensate system when the fin-fan cooler is connected to the cooling system.

4. A method of operating a combined cycle power plant, the method comprising:
passing a coolant through a cooling system into a gas turbomachine portion of the combined cycle power plant (CCPP);
absorbing heat from the gas turbomachine into the coolant;
directing the coolant through a heat exchange member;
guiding a steam condensate through a steam condensate system fluidly connected to a steam turbomachine portion of the CCPP;
passing the steam condensate through the heat exchange member;
transferring the heat entrained in the coolant to the steam condensate in the heat exchange member to form heated steam condensate;
passing the heated steam condensate to a heat recovery steam generator (HRSG);
sensing a temperature differential between the coolant and the steam condensate; and
disconnecting the heat exchange member from the cooling system and connecting a fin-fan cooler to the cooling system if the temperature differential is outside a predetermined temperature range.

5. The method of claim 4, further comprising: connecting a recirculation pump to the steam condensate system when the fin-fan cooler is connected to the cooling system.

6. The method of claim 5, further comprising: passing the steam condensate through the recirculation pump into the HRSG.

7. The method of claim 4, wherein disconnecting the heat exchange member from the cooling system occurs when the temperature differential between the coolant and the steam condensate is between about 15° F. (8.4° C.) and about 25° F. (14° C.).

8. The method of claim 7, wherein disconnecting the heat exchange member from the cooling system occurs when the temperature differential between the coolant and the steam condensate is between about 17° F. (9.5° C.) and about 22° F. (12.32° C.).

9. The method of claim 8, wherein disconnecting the heat exchange member from the cooling system occurs when the temperature differential between the coolant and the steam condensate is about 20° F. (11.2° C.).

10. The method of claim 4, further comprising: maintaining a stack temperature of the HRSG at an acid dew point temperature with the heated steam condensate.

* * * * *